Nov. 27, 1923.  
F. T. HERBERT, SR  
MECHANICAL COURSING DEVICE  
Filed Nov. 20, 1922    2 Sheets-Sheet 1
1,475,824
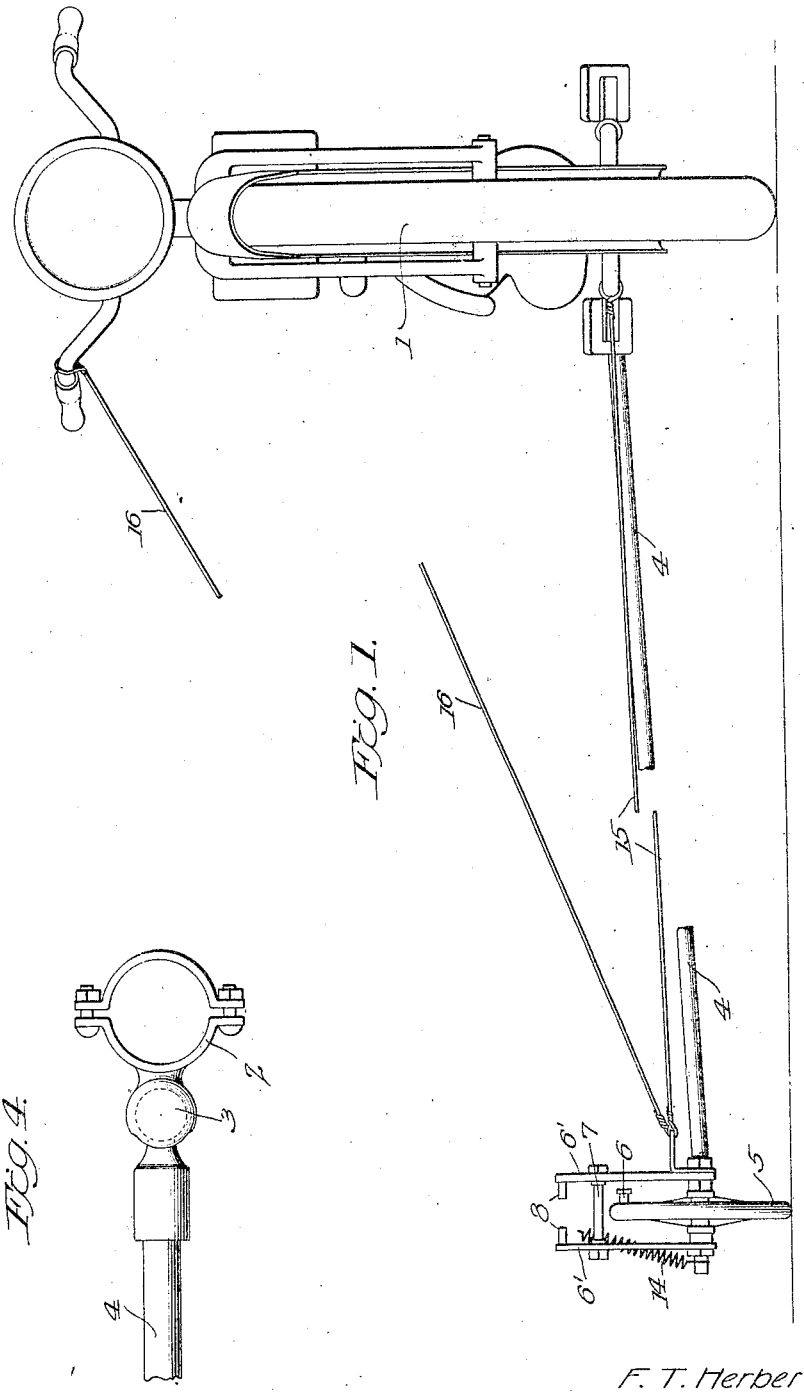
F. T. Herbert Sr.
INVENTOR Nov. 27, 1923.

F. T. HERBERT, SR 1,475,824

MECHANICAL COURSING DEVICE

Filed Nov. 20, 1922       2 Sheets-Sheet 2

Patented Nov. 27, 1923.

1,475,824

UNITED STATES PATENT OFFICE.

FRED T. HERBERT, SR., OF WYOMING, DELAWARE.

MECHANICAL COURSING DEVICE.

Application filed November 20, 1922. Serial No. 602,238.

*To all whom it may concern:*

Be it known that I, FRED T. HERBERT, Sr., a citizen of the United States, residing at Wyoming, in the county of Kent and State of Delaware, have invented new and useful Improvements in Mechanical Coursing Devices, of which the following is a specification.

An object of the invention is to produce a mechanical coursing device in which a figure representing an animal is supported from a vehicle, such as a motorcycle and which when the vehicle is propelled has movement imparted thereto whereby the said figure is caused to simulate a running animal.

To the attainment of the foregoing, and other objects which will present themselves as the nature of the invention is better understood, reference to be had to the accompanying drawings and which form part of this application.

In the drawings:

Figure 1 is a view of the improvement attached to a motorcycle.

Figure 2 is a sectional view taken on a line with the longitudinal plane of the rod or axle support for the improvement.

Figure 3 is a sectional view on the line 3—3 of Figure 2.

Figure 4 is a sectional view on the line 4—4 of Figure 1.

My improvement is designed to afford an inexpensive and simple device for use in public spectacles of dogs pursuing an artificial animal.

Referring now to the drawings in detail the numeral 1 designates a preferably power propelled vehicle, the same in the showing of the drawings, being in the nature of an ordinary motorcycle. To the lower portion of the frame of the motorcycle I attach a socket bearing 2, that receives therein a ball head 3 on one end of a rod or axle 4.

Journaled on the rod 4 adjacent to the upper end thereof, there is a wheel 5. Preferably the wheel is rubber tired and is journaled on anti-frictional bearings. The wheel 5 has a peripheral lug 6 projecting from the inner face thereof.

On the rod 4 there is integrally formed an upwardly directing spring which constitutes parallel members 6' connected by a brace 7. The members 6' straddle the upper portion of the wheel 5, and the said members have at their upper ends inwardly directed pivots 8 which find bearings in suitable sockets in the sides of a figure 9 which, in the present instance, is in the nature of a stuffed rabbit. Of course figures of other animals may be employed.

Secured to and depending angularly from the belly of the rabbit is a contact arm 10 in the path of engagement with the lug 6 on the wheel 5. In this connection it may be well to state that the lug 6 is headed and has arranged thereon a roller 11 to reduce friction when brought into contacting engagement with the arm 10.

The arm 10 is normally in contacting engagement with a stop element 12 to one of the vertical bars 6' of the wheel, the said stop element preferably having at its outer end a compressible buffer 13. The figure 9 has its arm 10 normally sustained in contacting engagement with the stop by a helical spring 14, one end of which being secured to the rod 4 outward of the frame, the other end being secured to the belly of the figure 9.

Bracing the rod to the motorcycle 1 are rods or cables 15, secured adjacent the outer end of the said rods, inward of the frame thereof and likewise secured to the motor frame. The connection between the elements 15 and motor frame is such as to permit a vertical swinging of the rod 4, but is also such as to prevent side swaying of the rod with respect to the motorcycle.

There is also secured to the upper end of the rod 4 a cable 16 which may have its free end adjustably secured on the motor frame and which is designed, when a pull is exerted thereon, to swing the rod 4 upwardly, as when the wheel 5 is in the path of contact with obstructions, or as when the motorcycle is propelled to and from the coursing field.

The animal figure is pivoted to the frame directly to the rear of the forelegs thereof, so that when the wheel 5 is in ground contacting position, the turning of the said wheel will cause the roller 11 on the lug 6 to ride against the inclined arm 10 to swing the rear end of the figure upwardly. When the roller rides off of the arm the expended spring 14 will return the animal figure to initial position, the contacting engagement of the arm 10 with the buffer on the end of the stop element 12 sustaining the figure in such position until again contacted by the roller. The arm 10 is comparatively long and the wheel 5 is comparatively small so that a substantially continuous up and down movement will be imparted to the figure 9, causing the same to simulate a continuously running animal which will attract the hounds or other dogs employed in the chase.

Having described the invention what is claimed is:—

1. In a mechanical coursing device, a motor cycle, a rod swivelled thereon and extending laterally therefrom, means holding the rod for lateral movement with respect to the motorcycle, means adjusting the rod at vertical angles with respect to the motorcycle, a ground wheel journaled on the rod, a figure representing an animal pivotally supported above the wheel, spring means holding the figure in one position, and means between the figure and wheel for swinging the former to a second position on the turning of the latter.

2. In a mechanical coursing device, a motorcycle, a rod pivoted thereto and extending laterally therefrom, brace means for the rod, to sustain the same against horizontal swaying, means for vertically adjusting the rod with respect to the motorcycle, a ground wheel journaled on the rod, a frame integrally formed with the rod including uprights disposed on the opposite sides of the wheel, a figure representing a pursued animal pivotally supported on the frame, spring means holding the figure in one position, and means between the figure and the wheel for swinging the former to a second position on the turning of the latter.

3. In a mechanical coursing device, a motorcycle, a rod pivoted for vertical swinging on one side thereof, flexible means between the rod and vehicle for sustaining the former at desired vertical angles with respect to the latter, a ground wheel journaled on the rod, a lug projecting laterally therefrom, a roller on the rod, an upstanding frame on the rod, a figure representing a pursued animal pivoted in the frame and arranged above the wheel, an angle arm depending rearwardly from the belly of the figure, a stop element on the frame for the arm, spring means swinging the figure to bring the arm in such contacting engagement, and said arm being in the path of contact with the roller on the wheel.

In testimony whereof, I affix my signature.

FRED T. HERBERT, Sr.